(12) United States Patent
Hirabe

(10) Patent No.: US 6,549,762 B1
(45) Date of Patent: Apr. 15, 2003

(54) METHOD FOR ESTIMATING ARRIVAL DIRECTION OF DESIRED WAVE

(75) Inventor: Masashi Hirabe, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/478,191

(22) Filed: Jan. 5, 2000

(30) Foreign Application Priority Data

Jan. 6, 1999 (JP) .......................................... 11-001291

(51) Int. Cl.$^7$ ................................................. H04B 1/38
(52) U.S. Cl. ......................... 455/132; 455/562; 342/56; 342/378
(58) Field of Search ........................... 455/132, 78, 82, 455/562, 129, 135, 456, 25, 130; 342/375, 378, 56, 107, 113; 343/751, 853

(56) References Cited

U.S. PATENT DOCUMENTS

| | | | |
|---|---|---|---|
| 4,103,304 A | | 7/1978 | Burnham et al. |
| 4,845,726 A | * | 7/1989 | Kurihara et al. ............. 370/479 |
| 5,218,359 A | | 6/1993 | Minamisono |
| 5,260,968 A | * | 11/1993 | Gardner et al. ............. 375/347 |
| 5,262,789 A | * | 11/1993 | Silverstein ................... 342/368 |
| 5,299,148 A | * | 3/1994 | Gardner et al. ............. 342/378 |
| 5,371,506 A | * | 12/1994 | Yu et al. ...................... 342/149 |
| 5,459,668 A | * | 10/1995 | Dogan et al. ................ 342/153 |
| 5,952,969 A | * | 9/1999 | Hagerman et al. .......... 342/457 |
| 6,008,759 A | | 12/1999 | Tangemann et al. |
| 6,009,334 A | * | 12/1999 | Grubeck et al. ............. 342/457 |
| 6,473,055 B2 | * | 10/2002 | Kohno et al. ................ 343/853 |

FOREIGN PATENT DOCUMENTS

| | | |
|---|---|---|
| EP | 0 632 286 A2 | 1/1995 |
| EP | 0 932 218 A2 | 7/1999 |
| JP | 7-140221 | 6/1995 |
| JP | 8-201498 | 8/1996 |
| JP | 8-262121 | 10/1996 |
| JP | 9-33628 | 2/1997 |
| JP | 9-257901 | 10/1997 |
| JP | 10-177065 | 6/1998 |
| JP | 10-206518 | 8/1998 |
| JP | 10-253730 | 9/1998 |
| JP | 11-133130 | 5/1999 |
| JP | 11-166965 | 6/1999 |

* cited by examiner

Primary Examiner—Nay Maung
Assistant Examiner—Sonny Trinh
(74) Attorney, Agent, or Firm—Sughrue Mion, PLLC

(57) ABSTRACT

A method for estimating an arrival direction of a desired wave in which the arrival direction of the desired wave can be estimated even in case of existence of a multiple reflection wave. An identical signal series is repetitively transmitted two or more times from a transmitting side. The transmitted signal series is received by an array antenna having a plurality of element antennas on a receiving side. When the signal is received by each of the element antennas, cross-correlation is calculated between the signal series corresponding to the different repetition of the signal transmission from the transmitting side. Then, a MUSIC algorithm or an ESPRIT algorithm using the cross-correlation matrix is applied to estimate the arrival direction of the desired wave.

13 Claims, 3 Drawing Sheets

METHOD FOR ESTIMATING ARRIVAL DIRECTION OF DESIRED WAVE

BACKGROUND OF THE INVENTION

1: Field of the Invention

The present invention relates to a method for estimating an arrival direction or arrival bearing of a radio wave, and more particularly to a method for estimating an arrival direction of a desired wave.

2: Description of the Prior Art

As a method for measuring an arrival direction of a radio wave, or a method of angle measurement, there has been proposed a method employing an array antenna composed of a plurality of element antennas and corresponding signal processing technology. One of the representative method thereof is such one that signals received by respective element antennas are subjected to calculation using an autocorrelation matrix and a MUSIC (MUltiple SIgnal Classification) algorithm so that the arrival direction of the radio wave is estimated. As for the MUSIC algorithm, there can be introduced an article, R. O. Schmidt, "Multiple Emitter Location and Signal Parameter Estimation," IEEE Trans., vol. AP-34, No. 3, pp. 276–280 (March 1986). Further, Japanese Patent Laid-Open Application No. Hei 8–201498 (JP, 08201498, A) discloses a method in which when carrying out angle measurement using the MUSIC algorithm, measurement error can be minimized even if a signal level is low. Japanese Patent Laid-Open Application No. Hei 8–262121 (JP, 08262121, A) discloses a method in which when carrying out angle measurement using the MUSIC algorithm, a virtual image can be suppressed even if a number of radio wave sources are present. Japanese Patent Laid-Open Application No. Hei 9–257901 (JP, 09257901, A) discloses a method in which a MUSIC algorithm employing a space smoothing processing is utilized for improving an angular resolution. And Japanese Patent Laid-Open Application No. Hei 10–177065 (JP, 10177065, A) discloses a method in which an angle of incidence of an incoming wave can be calculated with a smaller calculation cost by using a signal processing apparatus employing the MUSIC algorithm.

As a calculation algorithm for the angle measurement, in addition to the above-introduced MUSIC algorithms, there has been proposed an ESPRIT (Estimation of Signal Parameters via Rotational Invariance Techniques) algorithm. The ESPRIT algorithm is advantageous in yielding a calculation result with a smaller amount of arithmetic operations than the MUSIC algorithm. As for the ESPRIT algorithm, there can be introduced an article, R. Roy and T. Kailath, "ESPRIT—Estimation of Signal Parameters via Rotational Invariance Techniques", IEEE Trans., ASSP-37, 7, pp. 984–995 (1989). Also, Japanese Patent Laid-Open Publication No. Hei 10–206518 (JP, 10206518, A) discloses an example of a goniometer employing the ESPRIT algorithm.

However, the above-introduced methods and apparatus encounter the following drawback. That is, if an arrival direction of a radio wave is estimated by using the MUSIC algorithm or the ESPRIT algorithm under an environment in which not only a desired wave but also a reflected wave or interference wave thereof can be received, the arrival direction of the desired wave and the arrival direction of the interference wave are detected in a mixed manner. For this reason, it sometimes become impossible to identify the arrival direction or arrival bearing of the desired wave.

SUMMARY OF THE INVENTION

Therefore, an object of the present invention is to provide a method for estimating an arrival direction of a desired wave in which the arrival direction or arrival bearing of the desired wave can be estimated even under the presence of an interference wave or multiple reflection waves.

The above object can be achieved in such a manner that an identical signal series transmission is repeated twice or more from the transmitting side, the transmitted signal series are received by an array antenna composed of a plurality of element antennas at a receiving side, cross-correlation between a pair of received signal series each corresponding to different repetition time is calculated, and then the arrival direction of the radio wave is estimated by using a cross-correlation matrix thereof.

According to the present invention, the same signal series is repetitively transmitted in a continuous manner from the transmitting side, the transmitted signal is received by the array antenna on the receiving side and cross-correlation between the signal series repetitively received in a continuous manner is calculated, whereby it becomes possible to suppress the interference wave or reflected wave even under an environment in which an interference wave, reflected wave or multiple reflection waves are present. Further, if a MUSIC algorithm or the like is applied to the obtained cross-correlation matrix, it becomes possible to extract exclusively the arrival direction of the desired wave.

Even if the reflected waves arrive at different timings under the environment of presence of multiple reflection waves, when signal reception is carried out while attention is paid to a specific single reflected wave, the correlation of the signal series with the signal series deriving from the same reflected wave becomes large while the correlation of the signal series with another reflected wave becomes very small. Therefore, an arrival direction can be independently identified for each reflected wave by taking an advantage of the difference in arriving timing.

The above and other objects, features, and advantages of the present invention will become apparent from the following description referring to the accompanying drawings which illustrate examples of preferred embodiments of the present invention.

DESCRIPTION OF THE PREFERRED EMBODIMENT

Prior to providing description of the method for estimating an arrival direction of a desired wave according to the preferred embodiment of the present invention, a receiving system utilized for implementing the method will initially be described.

Figure 1:
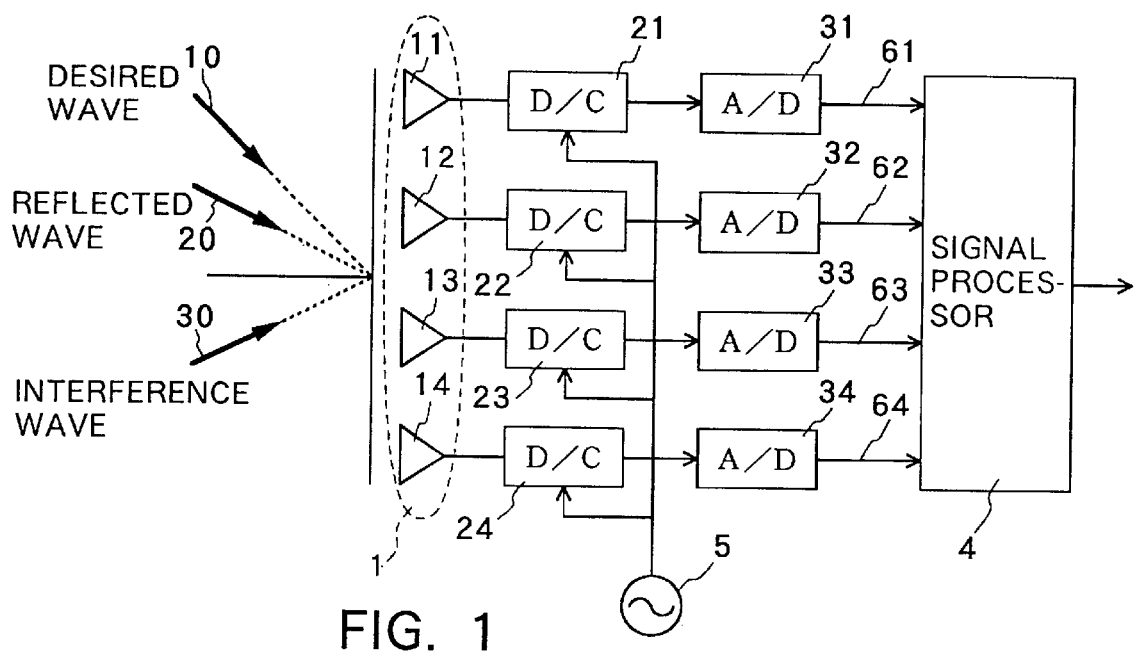
FIG. 1 is a block diagram showing an arrangement of a receiving system utilized for implementing the method for estimating an arrival direction of a desired wave in accordance with a preferred embodiment of the present invention.

As shown in FIG. 1, the receiving system is provided with array antenna 1 composed of a plurality of element antennas. According to the example shown in FIG. 1, array antenna 1 is provided with four element antennas 11 to 14 as the plurality of element antennas. Signals received by element antennas 11 to 14 of array antenna 1 are converted into IF (intermediate frequency) signals by down-converters (D/C) 21 to 24, respectively. Each of down-converters 21 to 24 is supplied with a local oscillation frequency signal from common local oscillator 5. Down-converters 21 to 24 are connected to analog-to-digital (A/D) converters 31 to 34, respectively. Analog-to-digital converters 31 to 34 convert the IF signals supplied from down-converter 21 to 24 into digital signals 61 to 64, respectively. Digital signals 61 to 64 are supplied to signal processor 4. Signal processor 4 serves for estimating the arrival direction of the desired wave by using an algorithm which will be described later on.

Array antenna 1 receives desired wave 10, reflected wave 20 and interference wave 30. Thus, each of element antennas 11 to 14 generates a signal deriving from combining desired wave 10, reflected wave 20 and interference wave 30 as a received signal.

Figure 2:
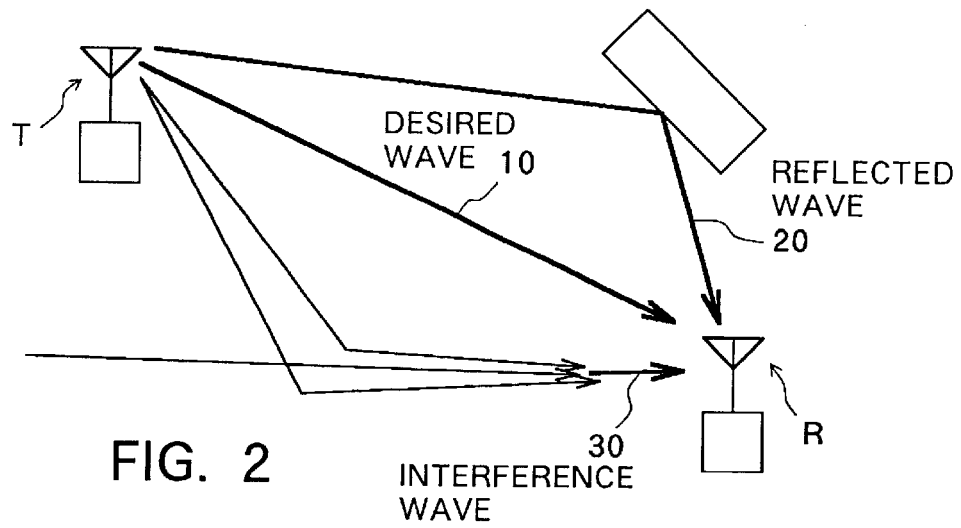
FIG. 2 is a layout diagram showing a relationship between a transmitting point and a receiving point.

A relationship between the transmitting point and the receiving point will be described with reference to FIG. 2. The receiving system shown in FIG. 1 is disposed on receiving point R. In this case, a radio wave directly transmitted from transmitting point T to receiving point R is taken as desired wave 10. Further, a radio wave transmitted from transmitting point T to receiving point R by way of reflection on ground structure 8 such as a building is taken as reflected wave 20. A radio wave having undergone interference with the radio wave itself or another radio wave, or a radio wave incident as a multiple reflection wave on receiving point R, is taken as interference wave 30. Similarly to desired wave 10, reflected wave 20 and interference wave 30 are received by each element antenna of the array antenna. Therefore, with the conventional method for estimating an arrival direction, it was difficult to estimate only the arrival direction of desired wave 10 while excluding influence from reflected wave 20 and interference wave 30. That is, it was difficult to estimate the direction in which the radio wave directly incoming from transmitting point T at receiving point R. While in the description the radio wave directly transmitted from the transmitting side to the receiving side is taken as the desired wave, the present invention can naturally be applied to a case in which an arrival direction of a particular reflected wave shall be estimated. In such a case, the following processing is to be executed under condition that the particular reflected wave is taken as the desired wave.

Now description will be made on the method for estimating an arrival direction of a desired wave according to the present embodiment. The following description will be made on the assumption that, prior to the communication between transmitting point T and receiving point R, the arrival direction of the desired wave is estimated by determining the orientation or azimuth of transmitting point T as viewed from receiving point R.

Figure 3:
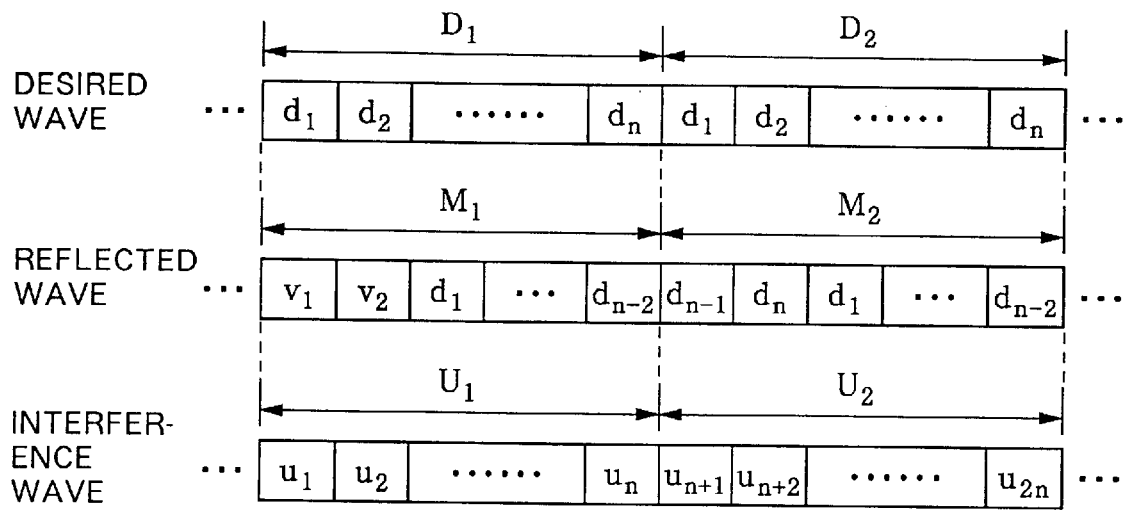
FIG. 3 is a timing chart showing signal series of a desired wave, a reflected wave, and an interference wave.

FIG. 3 is a diagram showing an example of signal series of desired wave 10, reflected wave 20 and interference wave 30 received at receiving point R and relationship among the signal series. Of course, only desired wave 10 is generated from transmitting point T.

According to the present embodiment, when the communication between transmitting point T and receiving point R is started, identical signal series $D_1$, $D_2$ each composed of n pieces of data ($d_1$ to $d_n$) are continuously transmitted from transmitting point T (see the signal sequence of desired wave 10 of FIG. 3). Then, as shown in FIG. 3, desired wave 10, reflected wave 20, interference wave 30 arrive at receiving point R, and a signal deriving from combining them is received by each element antenna. Now, signal series $M_1$, $M_2$ are taken as signal series of reflected wave 20 received at the same timing as that of the signal series $D_1$, $D_2$ of the desired wave 10, respectively. Similarly, signal series $U_1$, $U_2$ are taken as signal series of interference wave 30 received at the same timing as that of the signal series $D_1$, $D_2$ of the desired wave 10, respectively. Since the reflected wave 20 is delayed with respect to desired wave 10 by an amount of propagation delay, the signal series $M_1$ is composed of n pieces of data $v_1$, $v_2$, $d_1$, ..., $d_{n-2}$. In this case, the length of data pieces $v_1$, $v_2$ corresponds to the amount of propagation delay. On the other hand, interference wave 30 does not have large correlation with desired wave 10. Thus, signal series $U_1$ can be regarded as being composed of n pieces of data $u_1$ to $u_n$ while signal series $U_2$ can be regarded as being composed of n pieces of data $u_{n+1}$ to $u_{2n}$.

Figure 4:
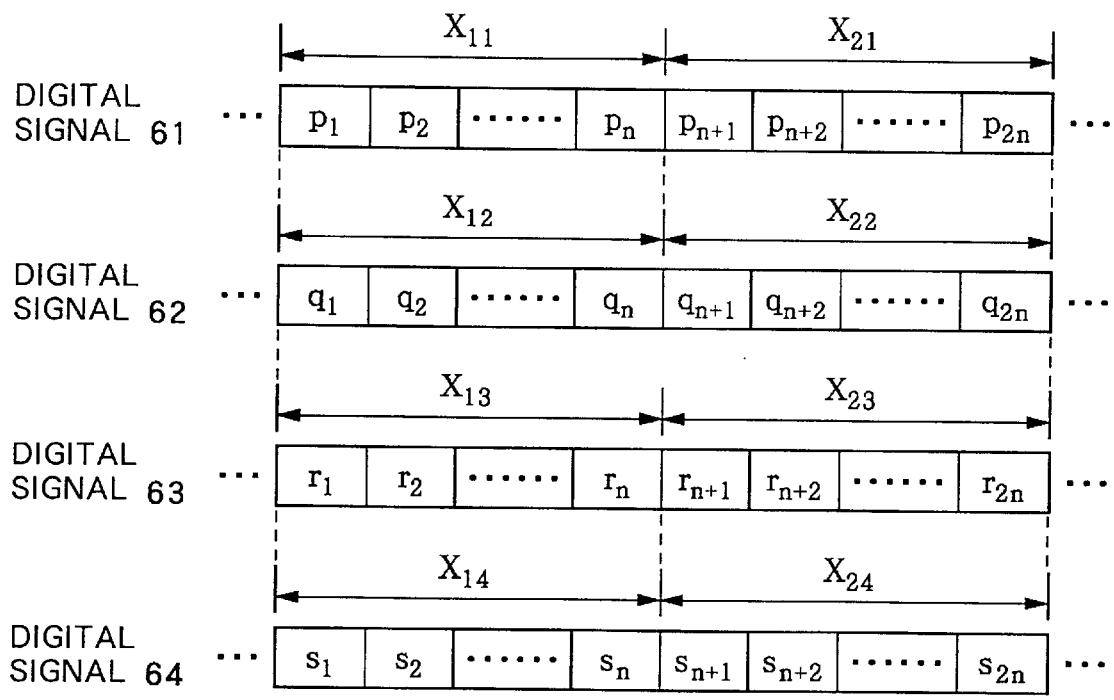
FIG. 4 is a timing chart showing signal series in a digital signal mode generated from respective analog-to-digital converters.

Thus, desired wave 10, reflected wave 20 and interference wave 30 are combined and received by the antenna, with the result that digital signals 61 to 64 received by element antennas 11 to 14 and supplied to signal processor 4 are arranged to have the relationship as shown in FIG. 4. That is, digital signal 61 deriving from first element antenna 11 is composed of signal series $X_{11}$ formed of n pieces of data $p_1$ to $p_n$ and successive signal series $X_{21}$ formed of n pieces of data $p_{n+1}$ to $p_{2n}$. In this case, signal series $X_{11}$ corresponds to the above-mentioned signal series $D_1$, $U_1$, $M_1$ while signal series $X_{21}$ corresponds to the above-mentioned signal series $D_2$, $U_2$, $M_2$. Therefore, data $p_1$ represents a result of the receiving and combining of data $d_1$, $v_1$, $u_1$. Similarly, digital signal 62 deriving from second element antenna 12 is composed of signal series $X_{12}$ formed of n pieces of data $q_1$ to $q_n$ and successive signal series $X_{22}$ formed of n pieces of data $q_{n+1}$ to $q_{2n}$. Digital signal 63 deriving from third element antenna 13 is composed of signal series $X_{13}$ formed of n pieces of data $r_1$ to $r_n$ and successive signal series $X_{23}$ formed of n pieces of data $r_{n+1}$ to $r_{2n}$. And digital signal 64 deriving from fourth element antenna 14 is composed of signal series $X_{14}$ formed of n pieces of data $s_1$ to $s_n$ and successive signal series $X_{24}$ formed of n pieces of data $s_{n+1}$ to $s_{2n}$.

Signal processor 4 calculates a cross-correlation matrix of signal series $X_{11}$, $X_{12}$, $X_{13}$, $X_{14}$ and successive signal series $X_{21}$, $X_{22}$, $X_{23}$, $X_{24}$ so as to suppress an interference wave component and a reflected wave component. Thereafter, the MUSIC algorithm is utilized to estimate the direction in which the radio wave is transmitted to receiving point R, whereby only the arrival direction of the desired wave is extracted. How the interference wave component and the reflected wave component can be suppressed by calculating the cross-correlation matrix will hereinafter be described with description on the signal processing effected in signal processor 4.

Since the above-mentioned signal series $D_1$, $D_2$, $M_1$, $M_2$, $U_1$, $U_2$, $X_{11}$ to $X_{14}$, $X_{21}$ to $X_{24}$ are all composed of n pieces of data, each of the signal series can be dealt as a column vector formed of n pieces of data as its elements. In the following description, signal series $D_1$, $D_2$, $M_1$, $M_2$, $U_1$, $U_2$, $X_{11}$ to $X_{14}$, $X_{21}$ to $X_{24}$ are each regarded as an n-dimensional column vector.

Column vectors $X_{11}$ to $X_{14}$, $X_{21}$ to $X_{24}$ of the digital signals supplied from respective element array antennas can be expressed by using desired wave 10 (column vectors $D_1$, $D_2$), reflected wave 20 (column vectors $M_1$, $M_2$), interference wave 30 (column vectors $U_1$, $U_2$), and thermal noise (column vectors $N_{ij}$; i, j=1 to 4) as follows.

$$X_{11} = D_1 \exp(jkd \sin \theta_d) + U_1 \exp(jkd \sin \theta_u) + M_1 \exp(jkd \sin \theta_m) + N_{11}$$

$$X_{12} = D_1 \exp(j2kd \sin \theta_d) + U_1 \exp(j2kd \sin \theta_u) + M_1 \exp(j2kd \sin \theta_m) + N_{12}$$

$$X_{13} = D_1 \exp(j3kd \sin \theta_d) + U_1 \exp(j3kd \sin \theta_u) + M_1 \exp(j3kd \sin \theta_m) + N_{13}$$

$$X_{14} = D_1 \exp(j4kd \sin \theta_d) + U_1 \exp(j4kd \sin \theta_u) + M_1 \exp(j4kd \sin \theta_m) + N_{14} \quad (1)$$

$$X_{21} = D_2 \exp(jkd \sin \theta_d) + U_2 \exp(jkd \sin \theta_u) + M_2 \exp(jkd \sin \theta_m) + N_{21}$$

$$X_{22} = D_2 \exp(j2kd \sin \theta_d) + U_2 \exp(j2kd \sin \theta_u) + M_2 \exp(j2kd \sin \theta_m) + N_{22}$$

$$X_{23} = D_2 \exp(j3kd \sin \theta_d) + U_2 \exp(j3kd \sin \theta_u) + M_2 \exp(j3kd \sin \theta_m) + N_{23}$$

$$X_{24} = D_2 \exp(j4kd \sin \theta_d) + U_2 \exp(j4kd \sin \theta_u) + M_2 \exp(j4kd \sin \theta_m) + N_{24} \quad (2)$$

where d represents the array interval of element antennas 11 to 14, $\theta_d$, $\theta_u$, $\theta_m$, represent arrival directions of desired wave 10, interference wave 30 and reflected wave 20, respectively, under the condition that the front direction of the array antenna is set to zero. Further, if $\lambda$ is taken as a wavelength, k represent a propagation constant ($2\pi/\lambda$).

Desired waves $D_1$, $D_2$, interference waves $U_1$, $U_2$, reflected waves $M_1$, $M_2$, and thermal noise $N_{ij}$ can be expressed as column vectors as follows by using the notations of signals of respective timings shown in FIG. 3.

$$D_1 = D_2 = [d_1 d_2 \ldots d_n]^T$$

$$U_1 = [u_1 u_2 \ldots u_n]^T$$

$$U_2 = [u_{n+1} u_{n+2} \ldots u_{2n}]^T$$

$$M_1 = [v_1 v_2 d_1 \ldots d_{n-2}]^T$$

$$M_2 = [d_{n-1} d_n d_1 \ldots d_{n-2}]^T$$

$$N_{ij} = [N_{ij1} N_{ij2} \ldots N_{ijn}]^T \quad (3)$$

where T is a notation of a transpose matrix.

In this case, calculation of cross-correlation matrix RX between column vectors $X_{11}$ to $X_{14}$ and column vectors $X_{21}$ to $X_{24}$ results in the following equation (4).

$$RX = \frac{1}{n} \begin{pmatrix} X_{11} \cdot X_{21}^H & X_{11} \cdot X_{22}^H & X_{11} \cdot X_{23}^H & X_{11} \cdot X_{24}^H \\ X_{12} \cdot X_{21}^H & X_{12} \cdot X_{22}^H & X_{12} \cdot X_{23}^H & X_{12} \cdot X_{24}^H \\ X_{13} \cdot X_{21}^H & X_{13} \cdot X_{22}^H & X_{13} \cdot X_{23}^H & X_{13} \cdot X_{24}^H \\ X_{14} \cdot X_{21}^H & X_{14} \cdot X_{22}^H & X_{14} \cdot X_{23}^H & X_{14} \cdot X_{24}^H \end{pmatrix} \quad (4)$$

where H represents an Hermitian matrix (conjugate transpose matrix).

Each matrix element of the above-introduced cross-correlation matrix RX of Equation (4) can be given as follows.

$$X_{1n} \cdot X_{2m}^H = D_1 \cdot D_2^H \exp(jnkd \sin \theta_d - jmkd \sin \theta_d)$$

$$) + D_1 \cdot U_2^H \exp(jnkd \sin \theta_d - jmkd \sin \theta_u)$$

$$) + D_1 \cdot M_2^H \exp(jnkd \sin \theta_d - jmkd \sin \theta_m)$$

$$) + D_1 \cdot N_{2m}^H \exp(jnkd \sin \theta_d)$$

$$) + U_1 \cdot D_2^H \exp(jnkd \sin \theta_u - jmkd \sin \theta_d)$$

$$) + U_1 \cdot U_2^H \exp(jnkd \sin \theta_u - jmkd \sin \theta_u)$$

$$) + U_1 \cdot M_2^H \exp(jnkd \sin \theta_u - jmkd \sin \theta_m)$$

$$) + U_1 \cdot N_{2m}^H \exp(jnkd \sin \theta_u)$$

$$) + M_1 \cdot D_2^H \exp(jnkd \sin \theta_m - jmkd \sin \theta_d)$$

$$) + M_1 \cdot U_2^H \exp(jnkd \sin \theta_m - jmkd \sin \theta_u)$$

$$) + M_1 \cdot M_2^H \exp(jnkd \sin \theta_m - jmkd \sin \theta_m)$$

$$) + M_1 \cdot N_{2m}^H \exp(jnkd \sin \theta_m)$$

$$) + N_{1n} \cdot D_2^H \exp(-jmkd \sin \theta_d)$$

$$) + N_{1n} \cdot U_2^H \exp(-jmkd \sin \theta_u)$$

$$) + N_{1n} \cdot M_2^H \exp(-jmkd \sin \theta_m)$$

$$) + N_{1n} \cdot N_{2m}^H \quad (5)$$

Since both of signal series $D_1$ and $D_2$ derive from the same desired wave, they have a high correlation with each other. Conversely, signal series $M_1$ and $M_2$ are signal series acquired at a timing different from that of the desired wave, and hence signal series $M_1$ and $M_2$ contain foreign data ($v_1$, $v_2$) as a part of the repetitive signals. Therefore, signal series $M_1$ and $M_2$ have a small correlation with each other. As for the interference wave components, since signal series $U_1$ and $U_2$ are arbitrary signal series, they have a small correlation with each other. Signal series $N_{1n}$ and $N_{2m}$ have a very small correlation due to the inherent property of thermal noise. Further, there is no correlation between signal series $D_1$ and $D_2$ of the desired wave and signal series $N_{1n}$ and $N_{2m}$ of the thermal noise, signal series $U_1$ and $U_2$ of the interference wave and signal series $N_{1n}$ and $N_{2m}$ of the thermal noise, and signal series $M_1$ and $M_2$ of the reflected wave and signal series $N_{1n}$ and $N_{2m}$ of the thermal noise. Furthermore, since signal series $D_1$ and $D_2$, signal series $U_1$ and $U_2$, and signal series $M_1$ and $M_2$ are different signal series among them, there are only small correlation between the desired wave and interference wave, desired wave and the reflected wave, and interference wave and the reflected wave. Therefore, Equation (5) can be approximated as follows.

$$X_{1n} \cdot X_{2m}^H \approx D_1 \cdot D_2^H \exp(jnkd \sin \theta_d - jmkd \sin \theta_d) \quad (6)$$

Since $D_1 = D_2$, only the cross-correlation matrix $X_{1n} \cdot X_{2m}^H$ becomes equal to the autocorrelation matrix $X_{1n} \cdot X_{1m}^H$ when received by array antenna 1. For this reason, if the MUSIC algorithm is applied to the cross-correlation matrix $X_{1n} \cdot X_{2m}^H$, then it is expected that the MUSIC spectrum of the matrix has a conspicuous local peak at a point corresponding to the arrival direction of the desired wave. Thus, it becomes possible to estimate the arrival direction of only the desired wave.

Further, the interference waves and reflected waves can have some cross-correlation between signal series ($U_1$ and $U_2$) and ($M_1$ and $M_2$), respectively. In this case, the MUSIC spectrum can have a local peak substantially equal to that of the desired wave at a point corresponding to the arrival direction of the interference wave or reflected wave. Even in such a case, if it is assumed that the incoming wave is a single wave and the MUSIC algorithm is applied to the cross-correlation matrix using all eigenvectors corresponding to eigenvalues except for the maximum eigenvalue, then the MUSIC spectrum will have a large local peak at the point corresponding to the arrival direction of the desired wave. In this way, it becomes possible to estimate the arrival direction of only the desired wave.

Figure 5:
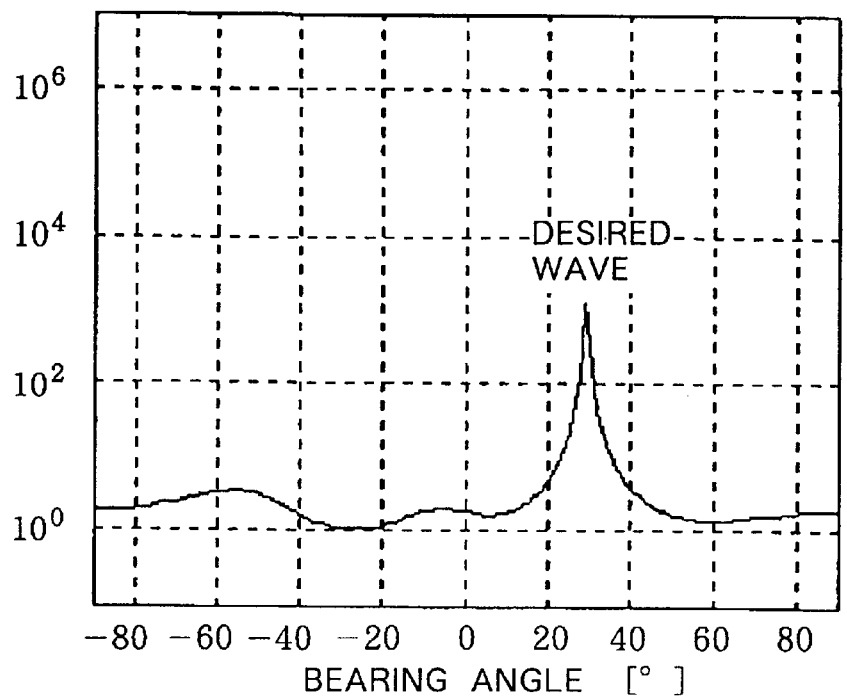
FIG. 5 is a graph showing a result of simulation of estimating arrival direction of the desired wave based on the method of the present invention.
Figure 6:
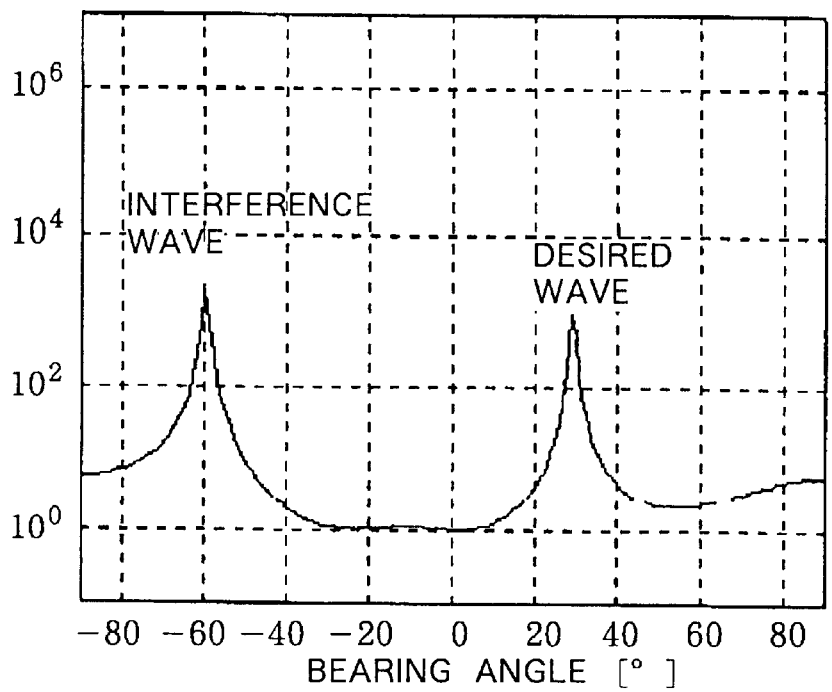
FIG. 6 is a graph showing a result of simulation of estimating arrival direction of the desired wave based on a conventional method.

FIGS. 5 and 6 are graphs each showing a result of simulation for estimating the arrival direction under condition that, at the receiving point R, the desired wave arrives in a direction (azimuth) of 30°, the interference wave arrives in a direction (azimuth) of 60°, the repeatedly transmitted signal series of the desired wave is composed of 512 data pieces, and such signal series transmission is repeated twice. FIG. 5 shows a MUSIC spectrum as a result of estimation based on the method for estimating the arrival direction of the desired wave according to the present embodiment. FIG. 6 is a MUSIC spectrum as a result of estimation based on a conventional method. As shown in FIG. 6, the MUSIC spectrum by the conventional method has peaks at both of the directions of the desired wave and interference wave. Conversely, the MUSIC spectrum based on the present embodiment has a peak at only the direction of the desired wave.

As has been described above, according to the present invention, it is necessary to carry out transmission of the same signal series a plurality of times from the transmitting side. When data communication is carried out, it is a general case that the same signal is repetitively transmitted for establishing synchronism in time or frequency. Therefore, if such a signal is utilized, there is no necessity in preparing a new signal series for estimating the arrival direction of the desired wave.

Also, according to the present invention, the degree of suppression of the reflected wave depends on how to take a timing of the signal series for calculating the cross-correlation matrix on the receiving side. However, if it is utilized that, in general, the desired wave can arrive at the receiving side at a timing earlier than that of the reflected wave, it becomes easy to settle the timing for calculating the cross-correlation matrix. In more concretely, there can be a scheme in which when a head portion of the data of signal series $D_1$ of the desired wave is detected (if any data series is provided so as to precede signal series $D_1$, the data series is detected) on the receiving side before the reflected wave arrives at the receiving side, then synchronism is tried to be established on the receiving side. Alternatively, there can be a scheme in which calculation of the cross-correlation matrix is effected while timing of received data acquisition is shifted, and a peak appearing first is determined as a peak corresponding to the desired wave.

If the latter scheme, or the scheme in which calculation of the cross-correlation matrix is effected while timing of received data acquisition is shifted, is employed, it becomes possible to separate and extract reflected waves having different propagation delays. In this case, it is possible to estimate the relative difference between the arriving timings of the respective reflected waves and arrival directions simultaneously. In this way, if estimation is carried out on the relative difference between the arriving timings of the respective reflected waves and arrival directions, it is desirable for the signal series, which is repetitively transmitted from the transmitting side, to be arranged as a pseudo-random series such as a maximum-length linearly recurring sequence (M-sequence), for example. Of course, if estimation is not carried out on the relative difference between the arriving timings of the respective reflected waves and arrival directions of the same, and only carried out is estimation on the arrival direction of the desired wave, the signal series repetitively transmitted from the transmitting side may also be arranged as a maximum-length linearly recurring sequence.

While a preferred embodiment of the present invention has been described above, the present invention is not limited to the above described embodiment. For example, if the transmission of the signal series is repeated three times or more from the transmitting side to increase the number of trials of estimation, and geometric mean is taken on the MUSIC spectrum for the estimation result, it can be expected to improve the accuracy of estimation. Moreover, the algorithm employed for estimating the arrival direction is not limited to the MUSIC algorithm but other algorithm using a correlation matrix such as an ESPRIT algorithm can be employed for estimating the arrival direction.

It is to be understood that variations and modifications of the method for estimating an arrival direction of a desired wave disclosed herein will be evident to those skilled in the art. It is intended that all such modifications and variations be included within the scope of the appended claims.

What is claimed is:

1. A method for estimating an arrival direction of a desired wave by receiving a radio wave propagated from a transmitting side at a receiving side, comprising the steps of:

receiving a signal series on the receiving side on an antenna array having a plurality of antenna elements, said signal series being repeatedly transmitted two or more times from the transmission side;

calculating a cross-correlation for each element antenna between a pair of the received signal series corresponding to different repetition times of the signal series; and estimating the arrival direction of the radio wave by using a cross-correlation matrix derived from the cross-correlation of each antenna element.

2. A method according to claim 1, wherein the number of repetition times for transmitting the signal series is set to three or more, a plurality of cross-correlation matrices are calculated for respective pairs of different repetition times thereby to estimate the arrival direction, and a geometric mean of results of the estimation result is calculated.

3. A method according to claim 1, wherein the arrival direction is estimated by subjecting the cross-correlation matrix to a MUSIC algorithm.

4. A method according to claim 1, wherein the arrival direction is estimated by subjecting the cross-correlation matrix to a MUSIC algorithm in which the number of incoming waves is assumed to be one and all eigenvectors corresponding to eigenvalues except for a maximum eigenvalue are utilized.

5. A method according to claim 1, wherein the arrival direction is estimated by subjecting the cross-correlation matrix to an ESPRIT algorithm.

6. A method according to claim 1, wherein if the radio wave is received together with multiple reflection waves thereof, the cross-correlation matrix is calculated for each timing of different timings, so as to determine an arrival direction of a reflected wave and an arrival timing difference of the reflected wave relative to another reflected wave having a different propagation delay.

7. A method according to claim 1, wherein the signal series transmitted from the transmitting side is arranged as a maximum-length linearly recurring sequence.

8. A method according to claim 6, wherein the signal series transmitted from the transmitting side is arranged as a maximum-length linearly recurring sequence.

9. A method according to claim 2, wherein the arrival direction is estimated by subjecting the cross-correlation matrix to a MUSIC algorithm.

10. A method according to claim 2, wherein the arrival direction is estimated by subjecting the cross-correlation matrix to a MUSIC algorithm in which the number of incoming waves is assumed to be one and all eigenvectors corresponding to eigenvalues except for a maximum eigenvalue are utilized.

11. A method according to claim 1, wherein the cross-correlation is calculated by digital signal processing.

12. A method according to claim 6, wherein the cross-correlation is calculated by digital signal processing.

13. An apparatus for estimating an arrival direction of a desired wave by receiving a radio wave propagated from a transmitting side at a receiving side, comprising:

an antenna array having a plurality of antenna elements, said antenna array receiving a signal series which is repeatedly transmitted form the transmitting side;

analog-to-digital conversion means for converting a signal received on each antenna element into a digital signal sequence; and processing means for calculating a cross-correlation for each antenna element between a pair of the received signal series corresponding to different repetition times, and estimating the arrival direction of the radio wave by using a cross-correlation matrix thereof.

* * * * *